United States Patent Office 3,763,058
Patented Oct. 2, 1973

3,763,058
POLYURETHANE ELASTOMERS WITH HIGH AFFINITY FOR DYES
Harald Oertel, Odenthal-Globusch, Helmut Reiff, Cologne, and Dieter Dieterich, Leverkusen, Germany, assignors to Bayer Aktiengesellschaft, Leverkusen, Germany
No Drawing. Filed Nov. 26, 1971, Ser. No. 202,670
Claims priority, application Germany, Nov. 27, 1970, P 20 58 502.8
Int. Cl. C08g 22/16, 22/44, 22/48
U.S. Cl. 260—2.5 AY                                     16 Claims

ABSTRACT OF THE DISCLOSURE

Polyurethane elastomers with high affinity for dyes which are characterised by a content of certain 2-alkyl-2-dialkylaminomethyl - 1,3 - propane-diols or alkoxylated derivatives thereof, and filaments produced therefrom.

---

This invention relates to light-soluble polyurethane elastomers having a high affinity for dyes through the incorporation of certain 2-alkyl-2-dialkyl-aminomethyl-1,3-propane diols and/or alkoxylated derivatives thereof, and to a process for their production.

Although polyurethane elastomers can be dyed with dispersion dyes, the dye finishes obtained are not sufficiently fast. An affinity for acidic dyes can be obtained through the incorporation of diols having one or more tertiary amino groups in the molecule (for example N-methyl diethanolamine), accompanied in many instances by an improvement in the resistance to discolouration under the effect of light (cf. British patent specification No. 1,079,597).

Unfortunately, these polyurethanes are in need of improvement in regard to their fastness to light (they show a tendency towards yellowing under the effect of light), in regard to the fastness of the dye finishes, and also in regard to their thermal stability. The improvement in both the affinity for dyes and in fastness which has already been obtained in accordance with the aforementioned British patent is attributed to the presence of the (aliphatically substituted) tertiary amino groups.

It has now surprisingly been found that, when 2-alkyl-2-dialkylaminomethyl-1,3-propane diols and/or alkoxylation products thereof as diols having an aliphatically substituted tertiary amino group are used, it is possible to obtain an affinity for dyes, a fastness in the dye finishes, a fastness to light (reduced discolouration) which are improved significantly beyond the level hitherto obtained, together with an increased thermal stability.

It can be presumed that by virtue of their specific structure these diols give the improved properties because, in contrast to the diols containing tertiary amino groups that have hitherto been used, they contain the tertiary amino group in the γ-position (instead of in the β-position) relative to the hydroxyl group and since, in addition, the tertiary amino group is not part of the polyurethane chain, but instead projects laterally from the linear polyurethane chains. The combination of these specific structural features in the 2-alkyl-2-dialkylamino-methyl-1,3-propane diols or alkoxylated derivatives thereof corresponding to the general formula

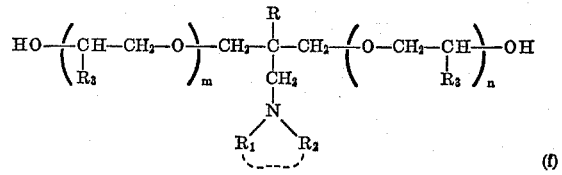

(I)

in which R, $R_1$, $R_2$, $R_3$, $m$ and $n$ are as defined further below, provides the unexpected improvement in the properties of polyurethane elastomers, preferably polyurethane elastomer filaments or films. The polyurethanes which are produced by the process according to the invention contain the specific tertiary amino groups as such and not in quaternised or salt-like form. The distinct improvements in the properties can be clearly demonstrated in examples and comparison tests.

It is therefore an object of this invention to provide a segmented polyurethane elastomer comprising recurring structural units of the general formula

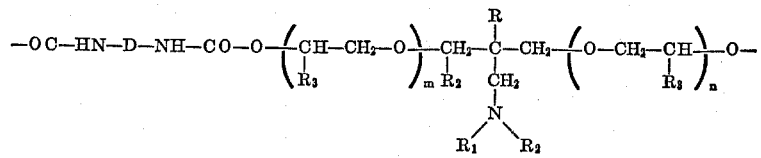

wherein

D represents the radical of an organic diisocyanate without the NCO-groups,
R represents a linear or branched $C_1$–$C_5$ alkyl radical,
$R_1$ represents a $C_1$–$C_4$ alkyl radical,
$R_2$ represents a $C_1$–$C_{18}$ alkyl radical,
$R_3$ represents hydrogen or methyl and
$m$ and $n$ each represent a number having an average value from 0 to 25.

In a more specific embodiment of the invention the segmented polyurethane elastomer comprises recurring structural units of the general formula
(a)                    —O—P—O—
(b)                    —Y—X—Y
and
(c)

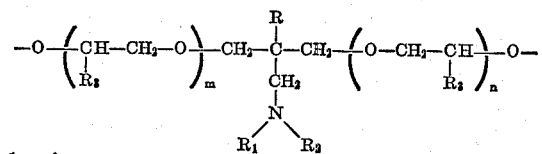

wherein

P represents the radical of a dihydroxy compound of molecular weight 500–5000 without the terminal hydroxyl groups,
X represents the radical of a chain lengthening agent without the terminal reactive groups,
Y represents —NH— or —O—
R represents a linear or branched $C_1$–$C_5$ alkyl radical,
$R_1$ represents a $C_1$–$C_4$ alkyl radical,
$R_2$ represents a $C_1$–$C_{18}$ alkyl radical, or
$R_1$ and $R_2$, together with the nitrogen atom to which they are attached form a ring containing 4–6 carbon atoms or a ring containing 4–6 carbon atoms and one or more additional hetero atoms,
$R_3$ represents hydrogen or methyl, and
$m$ and $n$ each represent a number having an average value from 0 to 25, said recurring structural units being attached to each other by scructural units of the general formula (d)         —CO—NH—D—NH—CO— wherein

D represents the radical of an organic diisocyanate without the NCO-groups, said structural unit (c) being present in such an amount that said elastomer contains 20–400 m.Equ. tert. N/kg.

It is a further object of this invention to provide a process for the production of a segmented polyurethane elastomer containing tertiary amino groups which comprises reacting a dihydroxy compound of molecular weight 500–5000, a compound of the formula

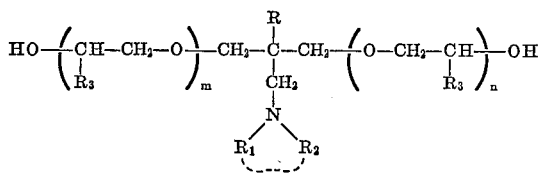

in which

R represents a linear or branched $C_1$–$C_5$ alkyl radical,
$R_1$ represents a $C_1$–$C_4$ alkyl radical,
$R_2$ represents a $C_1$–$C_{18}$ alkyl radical, or
$R_1$ and $R_2$ together with the nitrogen atom, to which they are attached form a ring containing 4 to 6 carbon atoms or a ring containing 4–6 carbon atoms and one or more additional hetero atoms,
$R_3$ represents hydrogen or methyl, and
$m$ and $n$ each represents a number having an average value from 0 to 25, an organic diisocyanate and a chain extending agent containing two reactive hydrogen atoms.

In a more specific embodiment there is provided a process for the production of a segmented polyurethane elastomer which comprises reacting in a first step a linear polyester or polyether with terminal hydroxyl groups with a molecular weight of from 500 to 5000 and a melting point below 60° C. and a compound of the general formula

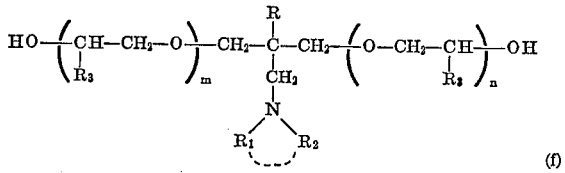

wherein

R represents a linear or branched $C_1$–$C_5$ alkyl radical,
$R_1$ represents a $C_1$–$C_4$ alkyl radical,
$R_2$ represents a $C_1$–$C_{18}$ alkyl radical, or
$R_1$ and $R_2$ together with the nitrogen atom, to which they are attached form a ring containing 4 to 6 carbon atoms or a ring containing 4–6 carbon atoms and one or more additional hetero atoms,
$R_3$ represents hydrogen or methyl, and
$m$ and $n$ each represent a number having an average value from 0 to 25, with a 1.3 to 3.0 fold molar excess of an organic diisocyanate to form a substantially linear NCO prepolymer, which is then reacted in a second step with a substantially equivalent quantity of a bifunctional chain extending agent containing two reactive hydrogen atoms to form a high molecular weight polyurethane with an intrinsic viscosity ($\eta_{intr.}$) of at least 0.5, wherein said reacting in a second step is carried out in a polar organic solvent, and wherein the compound of the general formula is reacted in such an amount that said polyurethane elastomer contains 20–400 m.Equ. tert. N/kg.

Examples of aliphatically substituted dihydric alcohols containing tertiary amino groups according to the general formula (f), suitable for use in the process according to the invention, include:

2-methyl-2-dimethylaminomethyl-1,3-propane diol
2-methyl-2-diethylaminomethyl-1,3-propane diol
2-methyl-2-di-n-propylaminomethyl-1,3-propane diol
2-methyl-2-pyrrolidinomethyl-1,3-propane diol
2-methyl-2-piperidinomethyl-1,3-propane diol
2-ethyl-2-dimethylaminomethyl-1,3-propane diol
2-ethyl-2-diethylaminomethyl-1,3-propane diol
2-ethyl-2-di-n-propylaminomethyl-1,3-propane diol
2-ethyl-2-pyrrolidinomethyl-1,3-propane diol
2-ethyl-2-piperidinomethyl-1,3-propane diol
2-n-amyl-2-dimethylaminomethyl-1,3-propane diol
2-methyl-2-(N-methyl-n-octylamino)-methyl-1,3-propane diol
2-n-butyl-2-(N-ethyl-n-octadecylamino)-methyl-1,3-propane diol or
2-ethyl-2-N(N'-methyl-piperazino)-methyl-1,3-propane diol.

2 - methyl-2-dimethylaminomethyl-1,3-propane diol; 2-methyl-2-diethylaminomethyl-1,3-propane diol; 2-ethyl-2-dimethylaminomethyl-1,3-propane diol; 2-ethyl-2-diethylaminomethyl - 1,3-propane diol; 2-methyl-2-N(N'-methyl piperazino)-methyl-1,3-propane diol and 2-ethyl-2-N-(N'-methyl piperazino)-methyl-1,3-propane diol, are preferably used in the process according to the invention.

These 2 - alkyl-2-dialkylaminomethyl-1,3-propane diols are prepared in accordance with Belgian patent specification 727,655 or its equivalent British patent specification 1,222,169 by splitting corresponding oxetanes with corresponding secondary amines.

Instead of the 2-alkyl-2-dialkylaminomethyl-1,3-propane diols, it is also possible, with advantage, to use their alkoxylation products with ethylene oxide or propylene oxide when it is desired to obtain elastomers which are intended to absorb dyes particularly quickly and completely. In this connection, one or both of the hydroxyl groups can be alkoxylated, or alternatively, mixtures of alkoxylated and non-alkoxylated diols may be employed. The number of alkylene oxide radicals added per hydroxyl group can be up to 25, although it is preferably from 1 to 12. Propylene oxide is preferably used as the alkoxylating agent ($R_3$=methyl). Alkoxylation can be carried out by conventional methods, although in this case it can also be successfully carried out in the absence of catalysts.

Synthesis of the polyurethane elastomers on a large scale is preferably carried out by the diisocyanate polyaddition process. However, the polyurethanes obtained from polychloroformic acid esters by the polycondensation process, having substantially the same structure, show substantially the same properties as the elastomers obtained by the diisocyanate polyaddition process.

To synthesise the polyurethane elastomers by the diisocyanate polyaddition process, it is best to use substantially linear polyhydroxyl compounds with substantially terminal hydroxyl groups and a molecular weight of from 500 to 5000, preferably from 750 to 3000 and preferably with melting points below 60° C., for example polyesters of polycarboxylic acids and polyhydric alcohols, polycarbonates, polyester amides, polyethers, polyacetals, poly-N-alkyl urethanes or mixtures thereof; and corresponding copolymers containing, for example, ester, carbonate, ether, acetal, amide, urethane or N-alkyl urethane groups adjacent to one another, in which connection the melting points of the relatively high molecular weight polyhydroxyl compounds should preferably be below 45° C. in order to obtain outstanding elastic and low-temperature properties. Throughout the specification these compounds are referred to as "relatively high molecular weight polyhydroxyl compounds." The polyhydroxyl compounds can also be modified with less than equivalent amounts of diisocyanates, accompanied by single or repeated pre-extension. The preferred molecular weight is in the range from 800 to 3000. It is also possible to use any mixtures of the polyhydroxyl compounds.

Examples of suitable relatively high molecular weight polyhydroxyl compounds can be found in U. S. Pats. 3,432,456, 3,499,872, and 3,377,308, and copending application U.S. Ser. No. 91,563 filed Nov. 20, 1970 as a division of Ser. No. 830,128, now U.S. Pat. 3,640,937.

Particular reference is made to polyesters of adipic acid, azelaic acid and sebacic acid and optionally mixtures of dialcohols with preferably 5 or more than 5 carbon atoms, for example 2,2-dimethyl-1,3-propane diol and 1,6-hexane diol because polyesters of this kind show a relatively high resistance to hydrolysis; polyethers, preferably polytetramethylene ether diols which may optionally be used in the form of mixed polyethers, for example, by copolymerising a relatively small quantity of propylene oxide or ethylene oxide.

The usual organic diisocyanates of the kind described in reference to the synthesis of polyurethanes and mentioned for example in the aforementioned patent specifications, are used for the reaction with the relatively high molecular weight polyhydroxyl compounds. It has proved to be particularly suitable to use diphenyl methane-4,4'-diisocyanate, the isomeric tolylene diisocyanates, and especially, in suitable proportions, aliphatic diisocyanates, for example hexane-1,6-diisocyanate or any mixtures of the stereoisomers of cyclohexane-1,6-diisocyanate or dicyclohexyl methane-p-p'-diisocyanate.

Examples of suitable organic chain extending agents include water and diols having molecular weights of less than 400 and primary hydroxyl groups attached to aliphatic carbon atoms, but especially ethylene glycol, butane diol, 2,2-dimethyl propane diol, hydroquinone bis-hydroxy ethyl ether or terephthalic acid bis-hydroxy ethyl ester.

Particularly suitable organic chain extending agents, which yield the high molecular weight urethane elastomers by reaction with NCO prepolymers, include preferably bifunctional relatively low molecular weight compounds (molecular weight preferably less than 400 and more particularly less than 275) containing —$NH_2$ and/or —$XCONHNH_2$ groups (—X—=—O—, —NH—, —$CH_2$—, or N-alkyl) for example diamines, hydrazines or "dihydrazide" compounds such as dicarboxylic acid dihydrazides, bis-carbazinic acid esters or bis-semicarbazides.

The following are examples of the chain extenders optionally used in admixture with one another:

water,
butane diol,
hydroquinone bis-hydroxy ethyl ester,
1,2-propylene diamine,
1,3-propylene diamine,
1,6-hexamethylene diamine,
1,3- and 1,4-cyclohexane diamine,
hexahydro-m-xylylene diamine,
m-xylylene diamine,
p-xylylene diamine,
hydroquinone-bis-(ω-aminopropyl)-ether,
2,5-dimethyl piperazine,
N,N'-dimethyl-N,N'-bis-(γ-aminopropyl)-ethylene diamine,
piperazine-N,N'-bis-(γ-propylamine),
4,4'-diaminodiphenyl methane,
4,4'-diamino diphenyl dimethyl methane,
1,2-bis-aminohydroxy ethane,
ω-amino acetic acid hydrazide,
ω-aminobutyric acid hydrazide,
ω-amino caproic acid hydrazide,
piperazine-N,N'-diacetic acid dihydrazide,
piperazine-N,N'-dipropionic acid hydrazide,
N,N'-dimethyl ethylene diamine-N,N'-dipropionic acid dihydrazide,
carbodihydrazide,
hydracrylic acid dihydrazide

[O($CH_2$—$CH_2$—CO—NH—$NH_2$)$_2$], adipic acid dihydrazide,
isophthalic acid dihydrazide,
m-xylylene dicarboxylic acid dihydrazide,
terephthalic acid dihydrazide,
ethylene glycol-bis-carbazine ester,
hexamethylene-bis-semicarbazide,
1,1-dimethyl-4-(γ-propylamino)-semicarbazide,
hydrazine,
hydrazine hydrate or
N,N'-diamino piperazine.

The chain extenders mentioned in Belgian patent specification No. 734,194, in British patent specification No. 1,248,181, in German Offenlegungsschrift No. 1,918,504, 1,942,560 and 1,952,394 are also eminently suitable, for example β-semicarbazido propionic acid hydrazide, β-semicarbazide ethylamine, p-semicarbazido aniline, β-semicarbazido ethyl carbazine ester, 4-semicarbazidobenzoic acid hydrazide, urea dipropionic acid dihydrazide or diphenyl methane-4,4'-bis-(urea benzoic acid hydrazide).

Aliphatic and araliphatic diamines, such as ethylene diamine, m-xylylene diamine, 1,3-diamino cyclohexane, hydrazine, carbodihydrazide, and β-semicarbazido propionic acid hydrazide are preferably used as chain extenders.

Compounds containing more than 2 reactive hydrogen atoms can also be used in some instances, but in small quantities only, for example trimethylol propane, diethanolamine, tartaric acid trihydrazide, citric acid trihydrazide or aliphatic triamines. Monofunctional compounds such as butylamine, 1-dimethylamino propylamine or N,N-dimethyl hydrazine can also be used in small quantities to reduce the viscosity.

To prepare the polyurethanes, the relatively high molecular weight substantially linear polyhydroxyl compound is initially reacted, either in solution or in the melt, with an excess of diisocyanate. In one preferred embodiment of the process according to the invention, the diol containing tertiary nitrogen atoms can be reacted together with the relatively high molecular weight substantially linear polyhydroxyl compounds with an excess of diisocyanate and then further recated with the chain extender in a polar solvent. The OH/NCO ratio is usually from 1:1.3 to 1:3.0, the reaction being carried out in the melt or in an inert solvent such as dioxan, benzene, chlorobenzene or dimethyl formamide at a temperature from about 20 to 120° C., preferably from 40 to 100° C., over such a period (approximately 15 to 150 minutes) that a substantially linear prepolymer with free NCO groups is obtained which, following chain extension with a substantially equivalent quantity of a chain extender preferably with —$NH_2$ and/or —XCONH—$NH_2$ terminal groups, yields a substantially linear product which is still soluble in highly polar solvents such as dimethyl formamide or dimethyl sulphoxide and which has an adequately high molecular weight (above 10,000). The elastomer solutions with solids contents of from about 15 to 30% by weight should have viscosities in the range from 10 to 2500 poises at 20° C. and intrinsic viscosities $$\eta_{intr.} = \frac{\ln \eta R}{C} \geq 0.5$$

(as measured on 1% by weight solution in hexamethyl phosphoramide at 20° C.).

Instead of introducing the diol containing tertiary amino groups together with the relatively high molecular weight polyhydroxyl compound, it is also possible to mix the diol into the reaction mixture of relatively high molecular weight polyhydroxyl compound and diisocyanate during, or on completion of, prepolymer formation.

In another embodiment of the process according to the invention, it is possible to react a reaction product, containing terminal hydroxyl groups, of the diol containing tertiary amino groups and a less than equvalent amount of diisocyanate, together with the relatively high molecular weight substantially linear polyhydroxyl compound and an excess of diisocyanate, and subsequently in a polar solvent with the chain extender. If the diol containing tertiary amino groups is reacted with a less than equivalent amount of disocyanate, in a molar ratio of for example from 2:1 to 1:1, a diol with tertiary amino groups attached through urethane groups is obtained.

Since it is possible for this purpose to use isocyanates different from those used for prepolymer formation with the relatively high molecular weight polyhydroxyl compound, defined polyurethane segments can be incorporated in this way. For example, it is possible by reacting 3 mols of 2-methyl-2-dimethylaminoethyl-1,3-propane diol with 2 mols of hexane-1,6-diisocyanate to obtain a diol containing three tertiary amino groups which is extremely fast to light. This diol or diol mixture can then be reacted, together with the linear relatively high molecular weight polyhydroxyl compound, with an aromatic diisocyanate, for example diphenyl methane-4,4'-diisocyanate, to form a prepolymer which is then subjected to further reaction with a diamine or other chain extender in a polar solvent.

It is also possible to prepare high molecular weight products (for example having an OH:NCO ratio of from 1.1:1 to 1.0:1) and to add them to the elastomers.

In another embodiment, it is also possible to react a chain extender with a reaction product, containing NCO groups, of a diol containing tertiary amino groups and excess diisocyanate in admixture with a reaction product, containing NCO groups, of a relatively high molecular weight substantially linear polyhydroxyl compound and a diisocyanate in a polar solvent. Aliphatic diisocyanates in a molar ratio of from 1:1.1 to 1:2 are particularly suitable for this purpose. For example, 1 mol of 2-ethyl-2-dimethylaminomethyl-1,3-propane diol and 2 mols of hexane diisocyanate give a low molecular weight adduct with free NCO groups which contains tertiary amino groups and which together with the usual prepolymer of relatively high molecular weight polyhydroxyl compound and, in general, aromatic diisocyanates, can be reacted with the chain extender in a polar solvent.

The advantage of this separate preparation of the reaction products containing NCO groups of relatively high molecular weight polyhydroxyl compound and diisocyanate on the one hand and diol containing tertiary amino groups and diisocyanate on the other hand is embodied in the catalytically completely unaffected formation of the usual NCO prepolymer.

The difficulty which arises during the reaciton of starting materials containing amide and/or urea groups during prepolymer formation in the presence of the diols containing tertiary amino groups, can be obviated by the separate preparation of a reaction product containing NCO groups of a diol containing tertiary amino groups and a diisocyanate.

It has been found that it is possible to mix the separately prepared prepolymers of relatively high molecular weight polyhydroxyl compound containing amide or urea groups and diisocyanate or diol containing tertiary amino groups and, preferably aliphatic, diisocyanate at room temperature without any danger of further reaction, and that, following reaction with the chain extender, the resulting mixtures very quickly yield the required substantially linear polyurethane elastomers.

In the process according to the invention, the segmented polyurethane elastomers formed contain a structural unit with tertiary amino groups of the formula

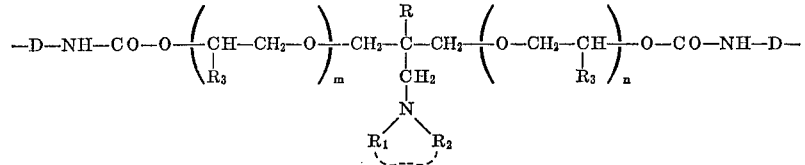

in which R, $R_1$, $R_2$, $R_3$, $m$ and $n$ have the meanings given above whilst D is the radical of an organic diisocyanate, preferably a 4,4'-diphenylmethane, tolylene-2,4- or hexamethylene-1,6-radical.

In addition, the segmented polyurethane elastomers preferably contain, as typical "hard segments" structural units corresponding to the formula

—D—NH—CO—NH—Z—NH—CO—NH—D— derived from diisocyanates (or NCO prepolymers of relatively high molecular weight polyhydroxyl compounds and excess quantities of diisocyanates) and chain extenders with terminal $NH_2$ groups.

Once again, D is the radical of an organic diisocyanate whilst Z is the molecular fragment of the chain extender $H_2N$—Z—$NH_2$ whose terminal —$NH_2$ groups react with the isocyanate groups.

Z is preferably an aliphatic, araliphatic, cycloaliphatic or aromatic divalent radical containing up to 13 carbon atoms (for example the ethylene-, m-xylylene, 1,3-cyclohexylene-, p-phenylene-, or 4,4'-dicyclohexyl methane radical), a —NH—CO—NH— radical, a —HN—CO—alkylene— or arylene—CO—NH— radical, an

—NH—CO—NH—alkylene—CO—NH— radical, an —alkylene—NH—CO—NH— radical or a direct bond. The alkylene radicals are preferably ethylene or propylene radicals.

The "soft segments" are preferably relatively high molecular weight polyesters or polyethers with terminal hydroxyl groups (HO—P—OH) which react with the isocyanate groups in the diisocyanates to form component structures, for example

—D—NH—CO—O—P—O—CO—NH—D—

(P is the radical of a dihydroxy compound of molecular weight 500–5000 without the terminal OH groups). The hard and soft segments are attached through the diisocyanate radicals D. The hard segment content of the elastomer amounts to from 10 to 30% by weight.

An adequate increase in the affinity of the polyurethane elastomers for dyes is obtained when the tertiary amino group content of the elastomer substance is from about 20 to 400 milliequivalents of tetriary amino groups per kilogram of solid polyurethane substance (20–400 m.Equ. $N_{tert}$·/kg.). A content of from 40 to 300, more particularly from 50 to 200 m.Eq.$N_{tert.}$/kg. is sufficient for most practical applications.

The quantity by weight of the diols containing tertiary amino groups used for modification is extremely low, amounting to from 0.5 to 10% of the weight of the relatively high molecular weight polyhydroxyl compounds. When higher-alkoxy-lated derivatives of the amino diols are used, the content can amount to about 20% by weight.

The structure of the prepolymers can be further modified by using, in addition to relatively high molecular weight polyhydroxyl compounds and the diols containing tertiary amino groups, other low molecular weight (molecular weight less than 250) diols (for example ethylene glycol, butane diol, or hydroquinone-bis-hydroxyethyl ether) in the reaction with the diisocyanate (10 to 200% of the OH content of the relatively high molecular weight polyhydroxyl compounds).

It is also possible to obtain elastomers with an improved affinity for dyes by mixing elastomers without any tertiary amino groups with elastomers containing a correspondingly high quantity of modifying diols containing tertiary amino groups. In this connection, it is of particular advantage that the products obtained from the solutions according to the invention are also elastomeric substances, in other words they do not have the effect of a rigid "filler substance."

The solutions initially obtained by the process according to the invention may optionally be further reacted, for example when free amine, hydrazide or similar terminal groups that are reactive to NCO groups are present, with diisocyanate or polyisocyanates, accompanied by an increase in viscosity, or with monoisocyanates or other "acylating" reagents such as pyrocarbonic acid diethyl ester or acetic anhydride, as a result of which the reactive terminal groups are converted into inactive terminal groups. Conversely, free unreacted isocyanate groups can be blocked by reaction with monofunctional compounds, for example primary or secondary amines (for example dibutylamine), or alcohols, substituted hydrazines (for example N,N-dimethyl hydrazine), hydrazides or semicarbazides when it is desired to prevent an undesirable further reaction of the terminal NCO groups. Pigments, dyes, optical brighteners, special light stabilisers, polyisocyanates, crosslinking agents or similar additives can be added to the elastomers.

The elastomers are produced and shaped in particular in or from their solution. Preferred polar solvents include organic solvents containing amide, sulphoxide or sulphone groups with boiling points of from 150 to 230° C. with are able to enter into strong hydrogen bridge bonds, for example dimethyl formamide, diethyl formamide, dimethyl acetamide, diisopropyl propionamide, formyl morpholine, hexamethyl phosphoramide, tetramethyl urea, dimethyl sulphoxide or tetra methylene sulphone. Other inert solvents, such as chlorobenzene dioxan, tetrahydrofuran, dioxolan or carbon tetrachloride can, however, also be added in small quantities.

Elastomeric filaments can be produced by the usual techniques, such as dry or wet spinning. Where they are produced by dry spinning, the spinning speeds are preferably in the range from about 100 to 800 metres per minute whilst, in wet spinning, they are considerably lower (5 to 50 metres per minute).

Elastomeric filaments can also be obtained by cutting from elastomeric films 0.10 to 0.20 mm. thick, using a film cutting machine. Elastomeric films or coatings can be obtained by spraying, brush-coating or knife-coating on to solid substrates or textile materials and evaporation the solvents. Microporous films can be obtained by specifically controlled coagulation processes preferably preceded by gelation under the effect of steam.

The properties of filaments or films are determined as follows:

RF=Ultimate tensile strength (in g./dtex)
Dhg.=Elongation (percent), tensile-testing machine with automatic compensation of slip through the grippers The elastic properties are measured by means of the Elasto-Tensograph (Farbenfabriken Bayer Aktiengesellschaft) described in Chimia 16, 93–105 (1962). The following characteristics are preferably determined:

M 300=Strain value (in mg./dtex) at 300% elongation of the filament and an elongation rate of 400% per min.
M 150=Strain value (n mg./dtex) at 150% elongation in the third relaxation cycle after three elongations to 300% at a rate of 400% per min.

Permanent elongation=Percentage permanent elongation after three-elongation/relaxation cycles (each comprising 300% maximum elongation at a rate of 400% per minute) 30 seconds after relaxation of the filament.

Fade-O-meter tests are carried out under normal test conditions.

Dyeing is carried out in accordance with the standard specifications described hereinafter:

For comparison purposes, dyeing was preferably carried out:

(a) with 2% by weight of the red dye according to German Pat. No. 230,594 (dyeing specification A) (Colour index acid red 23635),
(b) with 2% by weight of the blue acid dye (Colour index Acid Blue 220) dyeing specification A,
(c) with 10% by weight of the black after-chroming dye in accordance with dyeing Specification B (Colour index No. 14645—Mordant Black 11).

The use of these dyes is not intended in any way to represent a limitation, instead they were used because of their favourable response to any change in the affinity of the elastomeric substance for dyes.

DYEING SPECIFICATION A

Add 1% by weight of 60% by weight acetic acid to the dye batch, optionally with the assistance of 1 to 2% by weight of standard commercial equalising aids, at a temperature of 50° C., heat to boiling point and boil for 1 hour following the addition of another 2% of 60% acetic acid.

DYEING SPECIFICATION B (a) Heat the dye batch containing 2% by weight of 65% by weight acetic acid to boiling point and dye for 1 hour at boiling temperature following the addition of 4% by weight of 85% by weight formic acid.
(b) Heat thoroughly washed dye to boiling point with 3% by weight of potassium dichromate and 5% by weight formic acid and chrome for 1 to 1½ hours at boiling temperature.

The parts and percentages indicated in the examples are parts and percentages by weight unless otherwise stated.

PREPARATION SPECIFICATIONS FOR THE 2-ALKYL - 2 - DIALKYLAMINOMETHYL - 1,3-PROPANE DIOLS (1a) 2-ethyl - 2 - dimethylaminomethyl-1,3-propane diol (B.P.$_{0.9}$:122–124° C.; $n_D^{21}$:1.4655) and
(1b) 2-ethyl - 2 - diethylaminomethyl - 1,3 - propane diol (B.P.$_{0.1}$:115–118° C.; $n_D^{20}$:1.4688).

are prepared in accordance with the procedure described in Belgian patent specification No. 727,655.

(2) 2-methyl-2-dimethylaminomethyl-1,3-propane diol 612 parts of 3-methyl-3-hydroxymethyl oxetane and 1100 parts of 45% aqueous dimethylamine solution are heated for 10 hours at 180° C. in a refined steel autoclave. Excess aqueous dimethylamine is removed through a rotary evaporator and the residue is distilled in an oil pump vacuum. Yield 840 g. (95% of the theoretical) B.P.$_{0.06}$:79–80° C.; $n_D^{20}$:1.4618.

(3) 2-methyl-2-diethylaminomethyl-1,3-propane diol 306 parts of 3-methyl-3-hydroxymethyl oxetane, 440 parts of diethylamine and 300 parts of water are heated for 24 hours at 180° C. After excess diethylamine and water have been removed in a rotary evaporator, a crude product is obtained which contains 21% of starting oxetane and 78% of 2-methyl-2-diethylaminomethyl-1,3-propane diol. 395 parts (75% of the theoretical) of gas chromatographically pure product are obtained by distillation in water jet vacuum. B.P.$_{14}$:141–143° C.; $n_D^{23}$:1.4600.

If the reaction is carried out over a period of 36 hours at 185° C., the conversion is substantially quantitative.

(4) 2-ethyl-2-dibutylaminomethyl-1,3-propane diol 232 parts of 3-ethyl-3-hydroxymethyl oxetane, 800 parts of di-n-butylamine, 200 parts of water and 10 parts of lithium chloride are heated for 10 hours at 220° C. in a refined steel autoclave. Fractionation of the organic phase in an oil pump vacuum gives 104 parts (21% of the theoretical) of 2-ethyl-2-dibutylaminomethyl-1,3-propane diol (99.8% pure). B.P.$_{0.3}$:140–146° C.; $n_D^{21}$:1.4671.

If the test is carried out with 15 parts of boron trifluoride etherate instead of with lithium chloride, the yield amounts to 26% of the theoretical.

(5) 2-ethyl-2-N-methyl stearylaminomethyl-1,3-propane diol 232 parts of 3-ethyl-3-hydroxymethyl oxetane, 566 parts of N-methyl stearylamine, 250 parts of water, 250 parts of methanol and 20 parts of solid carbon dioxide are heated for 24 hours at 240° C. in a refined steel autoclave. After cooling, the reaction product is taken up in 800 parts of benzene, the solvent is distilled off and the residue is recrystallised twice from petroleum ether with a little active carbon added to it. Colourless crystals are obtained in a yield of 315 g., M.P. 52–53° C. Yield 40% of the theoretical.

*Analysis.*—Calculated (percent): C, 75.1; H, 13.4; N, 3.5; O, 8.0. Found (percent): C, 75.2; H, 13.5; N, 3.6; O, 7.9.

(6) 2-n-amyl-2-dimethylaminomethyl-1,3-propane diol 79 parts of 3-n-amyl-3-hydroxymethyl oxetane and 450 parts of 45% aqueous dimethylamine solution are heated for 12 hours at 185° C. in a refined steel autoclave. The conversion, based on oxetane, is 82%. Aqueous dimethylamine is removed in a rotary evaporator and the residue is fractionated. The diol is obtained in a yield of 81 g. or 79% of the theoretical. B.P.$_{15}$:170–171° C.; $n_D^{21}$: 1.4658.

(7) 2-ethyl-2-pyrrolidinomethyl-1,3-propane diol 2240 parts of 3-ethyl-3-hydroxymethyl oxetane, 3635 parts of pyrrolidine, 900 parts of water and 60 parts of solid carbon dioxide are heated for 12 hours at 220° C. in a refined steel autoclave. Fractionation gives 2040 parts (58% of the theoretical) of the diol. B.P.$_{0.04}$:136–140° C.; $n_D^{20}$:1.4879.

(8) 2-ethyl-2-piperidinomethyl-1,3-propane diol 325 parts of 3-ethyl-3-hydroxymethyl oxetane, 595 parts of piperidine, 140 parts of water and 12 parts of solid carbon dioxide are heated for 12 hours at 230° C. in an autoclave. After water and piperidine have been distilled off in a water jet vacuum, 509 parts of crude product are obtained. Purity 98.1%. Distillation gives 460 g. (82% of the theoretical) of a 99.6% pure product. B.P.$_{0.13}$:115–117° C.; $n_D^{20}$:1.4869.

(9) 2-ethyl-2-N-methyl-piperazinomethyl-1,3-propane diol 1625 parts of 3-ethyl-3-hydroxymethyl oxetane, 3500 parts of N-methylpiperazine, 700 parts of water and 60 parts of solid carbon dioxide are heated for 12 hours at 230° C. in a refined steel autoclave. The reaction product is freed from water and methyl piperazine in a water jet vacuum and the residue is distilled. Yield: 2125 parts (71% of the theoretical). B.P.$_{0.1}$:132–135° C.; M.P. 76–78° C. (following recrystallisation from acetone).

(10) 294 g. (2 mols) of 2-methyl-2-dimethylaminomethyl-1,3-propane diol are reacted at 100° C. with a total of 440 g. of ethylene oxide (added in portions of 50 to 100 g.) in a stainless steel autoclave flushed with nitrogen. The reaction is over after 3.5 hours. A fraction of B.P. 60–150° C. at 0.2 torr (240 g.) is selected for the investigations. OH number 463; acid number 0.7; average molecular weight 242. This corresponds to the formula

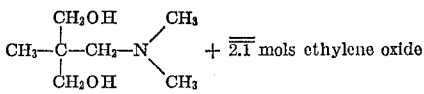

(11) The procedure is exactly the same as in (10) (except that only 194 g. of ethylene oxide are used). A fraction (200 g.) of B.P. 60–105° C. at 0.2 torr is obtained. It has an OH number of 598 and an acid number of 0.3. This corresponds to an average molecular weight of 187 and to the formula

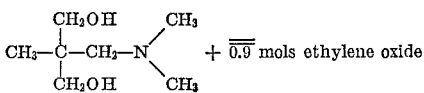

(12) 294 g. (2 mols) of 2-methyl-2-dimethylaminomethyl-1,3-propane diol are reacted at 100° C. with a total of 336 g. of propylene oxide in two portions in a 1.3 litre capacity VA-steel autoclave (flushed three times with nitrogen). The pressure falls from an initial 4.8 atms. to 1.1 atms. over a period of 6 hours and thereafter remains constant. The temperature is kept at 100° C. for 2 hours, followed by cooling to room temperature. Distillation in a high vacuum gives a fraction of B.P. 130–132° C. at 0.25 torr with an OH number of 468 and an acid number of 0.5. This corresponds to an average molecular weight of 240 and to the formula

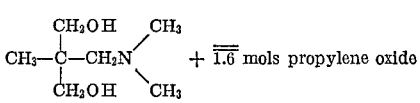

(13) The procedure is as in (12) except that 322 g. (2 mols) of 2-ethyl-2-dimethylaminomethyl-1,3-propane diol are used, and propoxylation is continued until the undistilled product has an OH number of 116 and an acid number of 0.2. This corresponds to an average molecular weight of 965 and to the formula

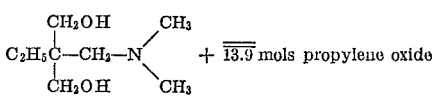

The following examples are to further illustrate the invention without limiting it.

EXAMPLE 1

600 parts of an adipic acid/1,6-hexane diol/2,2-dimethyl propane diol polyester (molar ratio of the diols 65:35) with a molecular weight of 1700 are reacted with 8.45 parts of a 2-ethyl-2-N-(N'-methyl-piperazine-methyl-1,3-propane diol corresponding to the formula

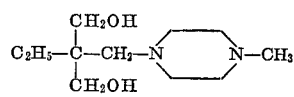

150.7 parts of diphenyl methane-4,4'-diisocyanate and 190 parts of dimethyl formamide for 105 minutes at around 50° C. to form an NCO prepolymer with an NCO content of 2.26% (based on the solids content).

(1/A) Chain extension with carbodihydrazide 2.80 parts of carbodihydrazide are dissolved at 70° C. in 226 parts of dimethyl formamide and the resulting solution is mixed with 107.5 parts of the above NCO prepolymer solution, resulting in the formation of a homogeneous colourless elastomer solution with a viscosity of 400 poises at 20° C. After pigmentation with 4% of TiO$_2$ (rutile) the solution is converted into films and filaments in the usual way.

(1/B) Chain extension with β-semicarbazido-propionic acid hydrazide 3.72 parts of β-semicarbazide propionic acid hydrazide (cf. German Offenlegungschrift No. 1,170,591) are dissolved in 7.5 parts of water and the resulting solution is diluted with 221 parts of dimethyl formamide. After 109.5 parts of the above NCO prepolymer solution have been stirred in, a homogeneous elastomer solution (434 poises) is obtained after pigmentation with 4% of $TiO_2$, and can be converted into filaments and films in the usual way.

(1/C) Chain extension with ethylene diamine carbonate 1.39 parts of ethylene diamine are dissolved in 223 part of dimethyl acetamide; 10 parts of solid carbon dioxide are added to the resulting solution to form a suspension of the diamine carbonate, followed by the introduction of 107.5 parts of the above NCO prepolymer solution. A homogeneous clear elastomer solution with a viscosity of 580 poises is obtained accompanied by the evolution of $CO_2$. After pigmentation with 4% of $TiO_2$, the solution is converted into filaments and films in the usual way.

The elastomers (1/A)–(1/C) each contain approrimately 100 m.Equ. $N_{tert.}$/kg. of solid elastomer.

Wet-spun elastomeric filaments are dyed with the red and blue acid dyes and with the black after-chroming dye in accordance with dyeing specifications A and B. Elastomeric filaments dyed in brilliant shades are obtained, the acidic dyes in the dye baths being substantially quantitatively absorbed. The black dye is absorbed to give a uniformly black dye finish which is fast to rubbing.

The very distinct improvement in the fastness of the dye finishes is demonstrated by the figures set out in Table 1. It is particularly the fastness of the filaments to perspiration that is significantly improved, which eliminates a typical deficiency of dyed elastomeric filaments.

A very distinctly reduced tendency towards yellowing and a reduction in loss of strength in comparison with the comparison tests is observed even under the effect of ultra violet light in a Fade-O-Meter. Yellowing only occurs after more than twice the exposure time observed with the comparison products.

The elastic properties of the films are at a favourable level; in contrast to the comparison tests, breaking elongation is significantly increased, which is highly desirable so far as the usual applications are concerned (see Table 2 which also shows the elastic properties of the following examples).

COMPARISON TEST A

Incorporation of N-methyl-bis-hydroxyethylamine in polyurethane elastomers in accordance with German Offenlegungsschrift No. 1,495,830.

1000 parts of the polyester described in Example 1, 16.0 parts of N-methyl-bis-hydroxyethylamine, 270 parts of diphenyl methane-4,4′-diisocyanate and 320 parts of dimethyl formamide are reacted for 80 minutes at 45 to 50° C. to form an NCO prepolymer with an NCO content of 2.20% (based on the solids content).

(A/1) Elastomer chain-extended with carbodihydrazide 9.13 parts of carbodihydrazide are dissolved in 1016 parts of warm dimethyl formamide and the resulting solution is reacted with 475 parts of the above NCO prepolymer solution to form an elastomer solution which, after pigmentation (4% of $TiO_2$), has a viscosity of 580 poises.

(A/2) Elastomer chain-extended with semicarbazido propionic acid hydrazide 16.35 parts of β-semicarbazido propionic acid hydrazide are dissolved under heat in 33 parts of water and the resulting solution is diluted with 1005 parts of dimethyl formamide. By stirring in 478 parts of the above NCO prepolymer solution followed by pigmentation (4% of TiO), an elastomer solution with a viscosity of 430 poises is obtained.

(A/3) Elastomer chain-extended with ethylene diamine 1.4 parts of ethylene diamine are dissolved in 225 parts of dimethyl formamide, and 10 parts of solid carbon dioxide are added after which 107 parts of the above NCO prepolymer solution are stirred into the carbonate suspension. After pigmenting (4% of $TiO_2$), an elastomer solution with a viscosity of 920 poises at 20° C. is obtained.

COMPARISON TEST B

Incorporation of N - methyl- bis -(β - hydroxypropyl)-amine into polyurethane elastomers in accordance with German Offenlegungsschrift No. 1,495,830.

1000 parts of the polyester described in Example 1, 15.5 parts of N-methyl-bis-(β-hydroxypropyl)-amine, 212.5 parts of diphenylmethane-4,4′-diisocyanate and 259 parts of dimethyl formamide are reacted for 55 minutes at 45–50°C. to form an NCO prepolymer with an NCO content of 2.11% (based on the solids content).

(B/1) Elastomer chain-extended with carbodihydrazide 8.74 parts of carbodihydrazide are dissolved under heat in 1017 parts of hot dimethyl formamide, followed by the addition to the resulting solution of 478 parts of the above NCO prepolymer solution, resulting in the formation of a homogeneous elastomer solution which, after pigmentation with 4% of $TiO_2$, has a viscosity of 638 poises.

(B/2) Elastomer chain-extended with semicarbazido propionic acid hydrazide 15.65 parts of β-semicarbazido propionic acid hydrazide are dissolved in 31 parts of water and 100 parts of dimethyl formamide, followed by the addition to the resulting solution of 478 parts of NCO prepolymer, pigmenting with 4% of $TiO_2$ and then by the addition of 0.10 part of hexane-1,6-diisocyanate, giving an elastomer solution with a viscosity of 470 poises.

(B/3) Elastomer chain-extended with ethylene diamine carbonate 12.95 parts of ethylene diamine are dissolved in 2230 parts of dimethyl formamide, the resulting solution is converted into the carbonate by the addition of 20 parts of solid carbon dioxide and the resulting suspension is reacted with 1075 parts of the above NCO prepolymer solution to form an elastomer solution. After the solution has been pigmented with 4% of $TiO_2$, a homogeneous elastomer solution with a solution viscosity of 510 poises is obtained.

The solutions are converted into films and filaments in the usual way. They contain approximately 100 m.Equ. of tert. amino groups per kg. of solid elastomer. Examples 1–4 and also the Comparison tests were carried out in such a way that the ratio of the OH groups in the polyester to the NCO groups in the diisocyanate amounts to 1:1.60 in each instance, and that the OH groups in the diol containing tertiary amino groups with further diisocyanate in a ratio of 1.0:1.0 were also taken into account. Hence, molecular synthesis has been carried out substantially identically.

TABLE 1.—FASTNESS OF DYE FINISHES ON ELASTOMERIC FILAMENTS

| | Filaments according to Ex. 1 | | | | Filaments according to comparison tests | | | | | | | |
|---|---|---|---|---|---|---|---|---|---|---|---|---|
| | | | | | Comparison test B | | | | Comparison test A | | | |
| | Ex. 1/A | | Ex. 1/B | | Test B/1 | | Test B/2 | | Test A/1 | | Test A/2 | |
| Fastness tested with respect to— | PA | Vi | PA | Vi | PA | Vi | PA | Vi | PA | Vi | PA | V |
| Washing at 40° C.: | | | | | | | | | | | | |
| 2% Acid Red C.I. 23635 | 4-5 | 5 | 5 | 4-5 | 4-5 | 4-5 | 4-5 | 4-5 | 4-5 | 4-5 | 4-5 | 4-5 |
| 2% Acid Blue 220 | 4-5 | 4-5 | 4 | 4-5 | 4-5 | 4-5 | 4-5 | 4-5 | 4 | 4-5 | 4 | 4 |
| 10% Mordant Black 11 (C.I.14645) | 5 | 4 | 5 | 4-5 | 4 | 3-4 | 4 | 3 | 3-4 | 3 | 3-4 | 3 |
| Perspiration(acid) (DIN 54020): | | | | | | | | | | | | |
| 2%Acid Red C.I. 23635 | 4-5 | 4-5 | 4-5 | 4 | 3-4 | 4 | 4 | 4 | 4-5 | 4 | 4 | 4 |
| 2% Acid Blue 220 | 4 | 4-5 | 4 | 4-5 | 4-5 | 4-5 | 4-5 | 4-5 | 4 | 4-5 | 4 | 4-5 |
| 10% Mordant Black 11 (C.I. 14645) | 3 | 3 | 4 | 4-5 | 3 | 3 | 2-3 | 3 | 2-3 | 2-3 | 2 | 2 |
| Perspiration(alkaline) (DIN 54020): | | | | | | | | | | | | |
| 2% Acid Red C.I. 23635 | 4-5 | 4-5 | 4 | 4 | 3 | 3 | 3 | 3 | 3 | 3 | 3 | 2-3 |
| 2%Acid Blue 220 | 4 | 4-5 | 2-3 | 4 | 3 | 4 | 3 | 3-4 | 2-3 | 2-3 | 2 | |
| 10%Mordant Black 11 (C.I. 14645) | 2 | 2 | 4 | 3-4 | 2 | 1-2 | 1-2 | 1-2 | 1-2 | 1-2 | 1-2 | 1-2 |

NOTE.—PA=Fastness tested in relation to polyamide fabrics; Vi=Fastness tested in relation to viscose fabric, Fastness scale 1=Very poor; 5=Very good. The filaments used for testing dye receptivity and dye fastness were all produced by wet spinning

EXAMPLE 2

800 parts of the mixed polyester described in Example 1 are heated for 80 minutes at 45° C. with 17.0 parts of a diol corresponding to the formula

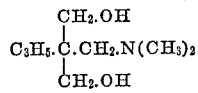

2-ethyl-2-demethylaminoethyl-1,3-propane diol and 215.5 parts of diphenyl methane-4,4'-diisocyanate in 260 parts of dimethyl formamide until the NCO prepolymer has an NCO content of 2.08% (based on the solids content).

(2/A) Chain extension with carbodihydrazide 7.69 parts of carbodihydrazide are dissolved in 1014 parts of hot dimethyl formamide and the resulting solution is mixed with 450 parts of the above NCO prepolymer solution following the addition of 4% $TiO_2$, resulting in the formation of a homogeneous elastomer solution with a viscosity of 735 poises. The solution is dry and wet spun into filaments or converted into films.

(2/B) Chain extension with β-semicarbazido propionic acid hydrazide 13.75 parts of semicarbazido propionic acid hydrazide are dissolved in 28 parts of water, 1004 parts of dimethyl formamide are added to the resulting solution which is then mixed with 450 parts of the above NCO prepolymer solution. The resulting elastomer solution is pigmented with 4% of $TiO_2$ and then converted into filaments and films in the usual way.

(2/C) Chain extension with ethylene diamine carbonate 1.28 parts of ethylene diamine are dissolved in 223 parts of dimethyl formamide, the resulting solution is converted into a suspension of the diamine carbonate by dropping approximately 5 parts of Dry Ice ($CO_2$) into it. The resulting suspension is in turn converted, with 103 parts of the above NCO prepolymer solution, into an elastomer solution (735 poises) which after pigmenting (4% $TiO_2$) is converted into films and filaments.

The elastomeric filaments (2/A)–(2/A) contain approximately 100 milliequivalents of tertiary amino groups per kg. of solid elastomer substance.

If filaments (2/B) and (2/C) (obtained by wet-spinning) are dyed in the manner described with the red and blue acid dyes (each used in a quantity of 2%), substantially complete absorption of the dye into the elastomeric filaments is observed. The fastness of the dyes is improved over that of the comparison tests. For example, fastness to perspiration (alkaline), which is particularly critical, is distinctly more favourable than the degree of fastness obtained in the comparison tests (dyeing with 2% of blue acid dyes):

Elastomeric filaments (2/A):
PA ---------------------------------------- 4
Vi ---------------------------------------- 4–5
Elastomeric filaments (2/B):
PA ---------------------------------------- 3–4
Vi ---------------------------------------- 4

The elastomeric films and filaments with the diols incorporated in accordance with the invention (for example of composition (2/C)) show a much higher thermal stability (resistance to discolouration under the effect of heat) than the comparison filaments with diols used in known manner (for example Comparison Test (B/3)). Thus, the diamine-extended elastomeric filament (2/C) remains completely free from discolouration after treatment for 1 hour at 170° C., whilst the elastomeric filament according to Comparison Example (B/3) shows an intensive yellow colouring.

Even in ultra-violet light (Fade-O-Meter), films obtained from elastomers of the comparison substance (for example (B/1) and (B/2)) discolour nearly twice as fast and twice as intensively as films obtained from elastomers (2/A) and (2/B). Thus, film (2/A) for example shows hardly any discolouration after 15 hours in the Fade-O-Meter, whilst the comparison films (B/1) shows an intensive yellow colouring. Mechanical degradation after exposure to ultra-violet light is also far less serious. Thus, after 15 hours in a Fade-O-Meter, film (2/B) produced by the process according to the invention shows no surface damage on elongation, whilst the comparison film (B/2), treated in the same way, shows an extremely friable surface attributable to serious damage to and discolouration of the elastomeric substance.

EXAMPLE 3

600 parts of a polyester with the composition described in Example 1 and a molecular weight of 1665 are heated for 95 minutes at 60 to 65° C. with 11.7 parts of 2-methyl - 2 - dimethylaminomethyl-1,3-propane diol corresponding to the formula

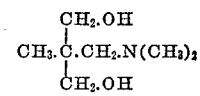

163.8 parts of diphenyl methane-4,4'-diisocyanate and 194 parts of dimethyl formamide to form an NCO prepolymer with an NCO content of 2.24% (based on the solids content).

(3/A) Chain extension with carbodihydrazide 3.09 parts of carbodihydrazide are dissolved in 70° C. in 329 parts of dimethyl formamide and the resulting solution is mixed with 162 parts of the above NCO prepolymer to form a homogeneous elastomer solution with a viscosity of 87 poises.

(3/B) Chain extension with β-semicarbazido propionic acid hydrazide 5.52 parts of semicarbazido propionic acid hydrazide are dissolved in 11 parts of water and 334 parts of dimethyl formamide, and the resulting solution is converted by the addition of 162 parts of the above NCO prepolymer into a homogeneous elastomer solution with a viscosity of 290 poises.

(3/C) Chain extension with ethylene diamine carbonate 2.06 parts of ethylene diamine are dissolved in 336 parts of dimethyl formamide, and 10 parts of solid carbon dioxide are added to the resulting solution to form the diamine carbonate, which is then stirred with 162 parts of the NCO prepolymer solution to form an elastomer solution with a viscosity of 283 poises.

The solutions are converted into filaments and films in the usual way. The elastomeric substance contains approximately 100 m.Equ. tert. N/kg.

In the dyeing of the elastomeric filaments, quantitative absorption of the dye from the bath is obtained with the blue dye. The red dye is almost quantitatively absorbed and gives dye finishes of improved fastness.

On exposure to ultra-violet light in a Fade-O-Meter, the elastomeric filament and films according to Examples (3/A), (3/B) and (3/C) show distinctly less discolouration and surface damage than is the case with the comparison elastomers (A/1) to (A/3) and (B/1) to (B/3).

Their thermal stability is also improved. Thus, films (1/C), (2/C) and (3/C) remain colourless after heating for 1 hour at 170° C. whilst elastomers (A/3) and (B/3), for example, show an intensive yellow colouring, in addition to which their strength is impaired.

EXAMPLE 4

600 parts of the polyester described in Example 3 are heated for 95 minutes at around 60° C. with 14.0 parts of a diol corresponding to the formula

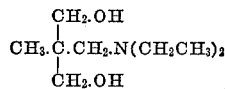

(2–methyl-2-diethylaminomethyl-1,3-propane diol)

and 164 parts of diphenylmethane-4,4'-diisocyanate in 196 parts of dimethyl formamide to give an NCO prepolymer having an NCO content of 2.24% (based on the solids content).

(4/A) Chain extension with carbodihydrazide 3.09 parts of carbodihydrazide are dissolved in 10 parts of water and 300 parts of dimethyl formamide and the resulting solution is stirred with 157 parts of the NCO prepolymer. The resulting colourless homogeneous elastomer solution has a viscosity of 660 poises.

(4/B) Chain extension with β-semicarbazido propionic acid hydrazide 5.54 parts of semicarbazido propionic acid hydrazide are dissolved in 11 parts of water and 334 parts of N-methyl pyrrolidone and the resulting solution is stirred intensively with 110.5 parts of the above NCO prepolymer solution. The resulting clear elastomer solution has a solution viscosity of 540 poises.

(4/C) Chain extension with ethylene diamine 2.07 parts of ethylene diamine are dissolved in 336 parts of dimethylacetamide, and the resulting solution converted into the corresponding carbonate with approximately 10 parts of solid carbon dioxide. Following the addition of 161 parts of the above NCO prepolymer solution, the hazy suspension is converted into a homogeneous elastomer solution having a viscosity of 380 poises, with elimination of carbon dioxide.

The films and filaments are produced from the solutions in the usual way. The solid elastomer has a tertiary amino group content of approximately 100 m.Equ. per kg. (100 m.Equ./kg.).

As in Example 3, the elastomeric filaments show improved dyeability, outstanding dye fastness, improved thermal stability and resistance to discolouration and degradation on exposure to light.

EXAMPLE 5

(5/A) Preparation of a polyurethane with terminal OH groups as additive 52.5 parts of the diol having tertiary amino groups described in Example 2 are dissolved in 104 parts of chlorobenzene, a solution of 52.2 parts of hexane diisocyanate in 104 parts of chlorobenzene is added to the resulting solution over a period of 30 minutes, followed by heating for 2 hours at 80 to 85° C. The resulting viscous solution, which has a solids content of 33% and $\eta_i$ 0.8, is used as an additive for elastomer solutions.

(5/B) NCO prepolymer for the preparation of elastomer solutions 600 parts of a polyester of the kind described in Example 3 are reacted in the melt at 90° C. with 288 parts of diphenyl methane-4,4'-diisocyanate and dissolved in 372 parts of dimethyl formamide to form an NCO prepolymer solution (2.35% NCO, based on the solids content).

(5/C) Preparation of a carbodihydrazide-extended elastomer solution 8.65 parts of carbodihydrazide are dissolved in 907 parts of dimethyl formamide, followed by the addition with stirring to the resulting solution of 423 parts of the NCO prepolymer solution according to (5/B), resulting in the formation of a clear, homogeneous elastomer solution with a viscosity of 500 poises. The solution is pigmented with 4% of TiO$_2$.

(5/D) Elastomer solution with polyurethane (5/A) added to it 1400 parts of the elastomer solution (5/C), diluted to 25%, are mixed with 37.5 parts of the polyurethane solution (5/A) and 20 parts of dimethyl formamide. The resulting 24.9% solution has a viscosity of 475 poises. The solid substance has a tertiary amino group content of approximately 100 m.Equ. per kg.

(5/E) Preparation of an elastomer solution chain-extended with semicarbazido propionic acid hydrazide 15.5 parts of semicarbazido propionic acid hydrazide are dissolved in 31 parts of water and 894 parts of dimethyl formamide, and the resulting solution is mixed with 422 parts of the NCO prepolymer described in (5/C), resulting in the formation of an elastomer solution with a solution viscosity of 267 poises. The viscosity of the homogeneous clear elastomer solution is increased to 575 poises by the addition of 0.30 part of hexane-1,6-diisocyanate. The elastomer solution is pigmented by the addition of 4% of TiO$_2$.

(5/F) Elastomer solution with polyurethane (5/A) added to it (50 m.Equ. N/kg.)

1240 parts of the elastomer solution (5/E) diluted to 25.0% are mixed with 16 parts of polyurethane solution (5/A). The viscosity of the resulting 24.7% solution is 550 poises, whilst the tertiary amino group content is 50 m.Equ. per kg. of solid substance (50 m.Equ./kg.).

(5/G) Elastomer solution with polyurethane (5/A) added to it (100 m.Equi. N/kg.)

1000 parts of elastomer solution (5/E) are mixed with 27.5 parts of polyurethane solution (5/A). Viscosity 550 poises, tertiary amino group content (100 m.Equ./kg.).

(5/H) Elastomer solution with polyurethane (5/A) added to it (200 m.Equ. N./kg.)

1000 parts of elastomer solution (5/E) are mixed with 55 parts of polyurethane solution (5/A). Viscosity 475 poises, tertiary amino group content approximately 200 m.Equ./kg.

Elastomeric filaments obtained from the above solutions by known methods show an excellent affinity for acid dyes, the dyes being absorbed from the dyeing bath at a rate which increases with increasing addition of (5/A), whilst stability to discolouration and degradation under the effect of light increases. Thus, with 200 m.Equ./kg. of (5/A) added to them, the elastomeric filaments show only very little discolouration and hardly any surface damage after some 44 hours in a Fade-O-Meter.

EXAMPLE 6

800 parts of a polytetramethylene ether diol with a molecular weight of 2080 are heated for 27 minutes at 32–40° C. with 15.1 parts of 2-methyl-2-dimethylaminomethyl-1,3-propane diol, 190 parts of diphenyl methane-4,4′-diisocyanate and 252 parts of dimethyl acetamide until the NCO content of the prepolymer solution has fallen to 2.255% (based on the solids content).

(6/A) Chain extension with hydrazine hydrate 2.45 parts of hydrazine hydrate are dissolved in 446 parts of dimethyl acetamide and converted with 10 parts of solid carbon dioxide into a suspension of carbazinic acid. 200 parts of the above NCO prepolymer solution are introduced into this solution over a period of 2 minutes. After pigmentation with 4% of $TiO_2$, the colourless elastomer solution has a viscosity of 440 poises.

(6/B) Chain extension with m-xylylenediamine 6.28 parts of m-xylylene diamine are dissolved in 458 parts of dimethylacetamide, followed by the addition of 15 parts of solid carbon dioxide. 200 parts of the above NCO prepolymer solution are introduced with stirring into the resulting suspension of the diamine carbonate, resulting in the formation, accompanied by the evolution of $CO_2$, of a homogeneous colourless elastomer solution having a viscosity of 540 poises at 20° C., which is pigmented with 4% of $TiO_2$.

(6/C) Chain extension with ethylene diamine 2.77 parts of ethylene diamine are dissolved in 446 parts of dimethyl acetamide followed by the addition of solid carbon dioxide to form the diamine carbonate. By stirring in 203 parts of the above NCO prepolymer solution, a homogeneous elastomer solution is obtained whose viscosity is increased to 205 poises at 20° C. by the addition of 0.5 part of tolylene-2,4-diisocyanate.

(6/D) Chain extension with a mixture of 85% of ethylenediamine and 15 mol percent of 1,3-diaminocyclohexane 1.34 parts of ethylene diamine and 0.24 parts of 1,3-diaminocyclohexane are dissolved in 449 parts of dimethyl acetamide followed by the addition of 10 parts of solid carbon dioxide. By introducing 203 parts of the above NCO prepolymer solution into the diamine carbonate suspension, a clear homogeneous elastomer solution with a viscosity of 74 poises at 20° C. is obtained. The viscosity is increased to 160 poises/20° C. by the addition of 0.4 part of hexane-1,6-diisocyanate.

200 parts of the above NCO prepolymer solution are reacted at 40° C. with 27 parts of diphenylmethane-4,4′-diisocyanate and 13.15 parts of 1,4-butane diol in 100 parts of anhydrous dimethyl acetamide, and the reaction mixture is diluted after 4 hours with 354 parts of dimethyl acetamide. The moderately viscous solution is cast into films.

Films are cast and filaments wet-spun from solutions (6/A) to (6/D). Elastomeric filaments with flat strength elongation behaviour and relatively high breaking elongation are obtained. The filaments show a high affinity for acid and chroming dyes coupled with outstanding fastness. The filaments are colourstable after heat treatment (for example for 1 hour at 170° C.). The measurement results are set out in Table 2.

A non-transparent white microporous film which shows outstanding permeability to water vapour and has a smooth surface is obtained by brush coating solution (6/A) in a layer thickness of 0.8 mm. on to pre-heated glass plates, pre-gelling the coating for about 30 minutes in a chamber filled with saturated steam at 98 to 100° C. followed by coagulation in a bath containing 5% of dimethyl formamide (for 1 hour) and rinsing with water for several hours.

The elastomers referred to in Table 2 has $\eta_i$-values of from 0.80 to 1.25.

TABLE 2.—ELASTIC PROPERTIES OF FILMS (MEASURED IN THE FORM OF CUT FILAMENTS)

| Example number | Denier (dtex.) | Ultimate tensile strength (g./dtex.) | Breaking elongation (percent) | Modulus 300% (m.g./dtex.) | Permeability elongation (percent) |
|---|---|---|---|---|---|
| 1/A | 250 | 0.79 | 604 | 103 | 11 |
| 1/B | 243 | 0.58 | 660 | 113 | 16 |
| 1/C | 234 | 0.64 | 647 | 75 | 25 |
| 2/B | 338 | 0.79 | 560 | 107 | 8 |
| 2/C | 374 | 0.66 | 607 | 116 | 11 |
| 3/A | 365 | 0.68 | 573 | 94 | 14 |
| 3/B | 360 | 0.67 | 629 | 111 | 15 |
| 3/C | 340 | 0.66 | 605 | 78 | 20 |
| 4/A | 311 | 0.71 | 572 | 78 | 12 |
| 4/B | 301 | 0.65 | 610 | 118 | 12 |
| 4/C | 310 | 0.60 | 606 | 75 | 20 |
| 5/C | 270 | 0.82 | 620 | 95 | 13 |
| 5/D | 320 | 0.72 | 620 | 100 | 19 |
| 5/E | 288 | 0.62 | 634 | 110 | 14 |
| 5/F | 274 | 0.68 | 657 | 110 | 16 |
| 5/G | 328 | 0.73 | 704 | 112 | 19 |
| 5/H | 348 | 0.66 | 660 | 121 | 24 |
| 6/A | 325 | 0.62 | 625 | 82 | 15 |
| 6/B | 339 | 0.62 | 640 | 62 | 24 |
| 6/C | 330 | 0.50 | 716 | 70 | 25 |
| 6/D | 315 | 0.44 | 665 | 66 | 20 |
| Comparison test: | | | | | |
| A/1 | 293 | 0.71 | 499 | 94 | 11 |
| A/2 | 269 | 0.82 | 582 | 153 | 14 |
| B/1 | 320 | 0.71 | 538 | 114 | 11 |
| B/2 | 314 | 0.70 | 557 | 123 | 12 |

EXAMPLES 7–12

To form the NCO prepolymers, the procedure is as described in Example 6 except that the 15.1 parts of 2-methyl-2-dimethylaminomethyl-1,3-propane diol are replaced by the quantities of γ-amino diols indicated in Table 3.

TABLE 3

| Ex. No. | Parts by weight | Amino diol |
|---|---|---|
| 7 | 19.38 | 2-ethyl-2-dimethylaminomethyl-1,3-propane diol. |
| 8 | 25.20 | 2-ethyl-4-dibutylaminomethyl-1,3-propane diol. |
| 9 | 44.0 | 2-ethyl-2-N-methylstearylaminomethyl-1,3-propane diol |
| 10 | 20.3 | 2-n-amyl-2-dimethylaminomethyl-1,3-propane diol. |
| 11 | 17.8 | 2-ethyl-2-pyrrolidinomethyl-1-3-propane diol. |
| 12 | 19.2 | 2-ethyl-2-piperidinomethyl-1,3-propane diol. |

In each instance, the chain extending reaction is carried out with equivalent quantities of β-semicarbazido propionic acid hydrazide in dimethyl acetamide heated to around 60° C. (in such quantities that a 25% elastomer solution is formed). The elastomer solutions are dried to form films and wet-spun into filaments. The filaments and films show a high affinity for acid dyes, outstanding fastness to light and (in the case of Example 10) reduced surface tackiness.

EXAMPLE 13

400 parts of the polyester described in Example 1 (OH number 69.6) are heated for 135 minutes at 55° C. with 14 parts of ethoxylated 2-methyl-2-dimethylaminomethyl-1,3-propane diol (OH number 463) ethoxylated with an average absorption of 2.1 mols of ethylene oxide (see preparation specification 10), 113.8 parts of diphenylmethane-4,4'-diisocyanate and 132 parts of dimethyl formamide. After cooling, the prepolymer solution has an NCO content of 2.20% (based on the solids content).

(A) Chain extension with carbodihydrazide 162.5 parts of the above NCO prepolymer solution are added with stirring to 3.04 parts of carbodihydrazide in 339 parts of dimethyl formamide. The resulting clear homogeneous elastomer solution (24 poises at 20° C.) is cast into films and wet-spun into filaments.

The filaments show a high affinity for the red and blue acid dyes and completely absorb the dyes.

(B) Chain extension with β-semicarbazido propionic acid hydrazide 5.44 parts of semicarbazido propionic acid hydrazide are dissolved in 11 parts of water and 335 parts of dimethyl formamide, and the resulting solution is stirred with 162.5 parts of the above NCO prepolymer solution to form a clear homogeneous elastomer solution (viscosity 17 poises at 20° C.).

The filaments obtained from this solution absorb the red and blue acid dyes quickly and completely.

The properties of filaments cut from films of the elastomers of Examples 13 to 16 are set out in Table 4.

EXAMPLE 14

400 parts of the polyester described in Example 1 (OH number 69.6) are reacted for 60 minutes at 52–54° C. with 10.15 parts of the approximately 0.9 molar ethoxylated 2-methyl-2-dimethylaminomethyl-1,3 - propane diol (OH number 598) (see preparation specification 11), 112.9 parts of diphenyl methane-4,4'-diisocyanate and 132 parts of dimethyl formamide, to form an NCO prepolymer having an NCO content of 2.26% (based on the solids content).

(A) Chain extension with carbodihydrazide 3.12 parts of carbodihydrazide are dissolved at 60° C. in 339 parts of dimethyl formamide, followed by the addition of 162.5 parts of the above NCO solution to form an elastomer solution having a viscosity of 85 poises at 20° C.

(B) Chain extension with β-semicarbazidopropionic acid hydrazide 5.6 parts of semicarbazidopropionic acid hydrazide are dissolved in 11 parts of hot water, followed by the addition of 334 parts of dimethyl formamide and 162.25 parts of the above NCO prepolymer solution to form a homogeneous elastomer solution having a viscosity of 48 poises at 20° C.

Filaments wet-spun from the above elastomer solution show a high affinity for the red and blue dyes and are distinguished by an increased dye-absorption rate and complete absorption of the dye baths (see Table 4).

EXAMPLE 15

400 parts of the polyester described in the preceding example are reacted for 115 minutes at 50 to 52° C. with 13.05 parts of the prepoxylated 2-methyl-2-dimethylaminomethyl-1,3-propane diol (see preparation specification 12) propoxylated with, on average, approximately 1.6 mols of propylene oxide, 113 parts of diphenyl methane - 4,4' - diisocyanate and 132 parts of dimethyl formamide, to form an NCO prepolymer having an NCO content of 2.34% (based on the solids content).

(A) Chain extension with carbodihydrazide 3.155 parts of carbodihydrazide are dissolved in 339 parts of warm dimethyl formamide and the resulting solution is stirred with 155.5 parts of the above NCO solution to form a clear, homogeneous elastomer solution having a viscosity of 730 poises at 20° C.

(B) Chain-extension with β-semicarbazidopropionic acid hydrazide 5.64 parts of β-semicarbazidopropionic acid hydrazide are dissolved in 11 parts of water and 334 parts of dimethyl formamide, and the resulting solution is stirred with 160.5 parts of the above NCO prepolymer solution to form a clear highly viscous elastomer solution with a viscosity of 540 poises at 20° C.

Filaments wet-spun from the above elastomer solution are distinguished by an increased dye-absorption rate and complete absorption of the dye from the dye baths (see Table 4).

EXAMPLE 16

800 parts of the polyester described in the preceding example are reacted for 95 minutes at 50° C. with 113.6 parts of the propoxylation product of 2-methyl-2-dimethylaminomethyl-1,3-propane diol (OH number 116), cf. preparation specification 13, 228.4 parts of diphenylmethane-4,4'-diisocyanate and 286 parts of dimethyl formamide, to form an NCO prepolymer (2.05% NCO, based on the solids content).

(A) Chain extension with carbodihydrazide 7.54 parts of carbodihydrazide are stirred with 410 parts of the above NCO prepolymer solution in 226 parts of dimethyl formamide at 70° C. to form a homogeneous, clear, colourless elastomer solution with a viscosity of 485 poises which is pigmented with 4% of $TiO_2$ and is cast into films and, after dilution to 20% (85 poises), is wet-spun.

(B) Chain extension with β-semicarbazidopropionic acid hydrazide 13.45 parts of semicarbazidopropionic acid hydrazide are dissolved in 26 parts of warm water followed by the addition of 893 parts of dimethyl formamide, 420 parts of the above NCO prepolymer solution and 4% of $TiO_2$ (based on the solids content) to form a homogeneous highly viscous (500 poises at 20° C.) elastomer solution.

Elastomeric filaments obtained from the above solutions show a high affinity for dyes, both in regard to absorption rate and in regard to dye absorption. The filaments show improved fastness and are free from discolouration after heating for 1 hour at 170° C. (see Table 4).

TABLE 4.—ELASTIC PROPERTIES OF FILMS (MEASURED IN THE FORM OF CUT FILAMENTS)

| Ex. No. | Denier (dtex.) | Ultimate tensile strength (g./dtex.) | Breaking elongation (percent) | Modulus 300% (mg./dtex.) | Permeability elongation (percent) |
|---|---|---|---|---|---|
| 13A | 295 | 0.58 | 580 | 98 | 17 |
| 13B | 431 | 0.58 | 639 | 93 | 17 |
| 14A | 392 | 0.74 | 563 | 119 | 13 |
| 14B | 332 | 0.57 | 602 | 125 | 16 |
| 15A | 355 | 0.86 | 540 | 144 | 13 |
| 15B | 375 | 0.77 | 586 | 140 | 13 |
| 16A | 302 | 0.68 | 518 | 128 | 11 |
| 16B | 301 | 0.70 | 598 | 123 | 12 |

What we claim is:

1. A segmented polyurethane elastomer comprising recurring structural units of the general formula

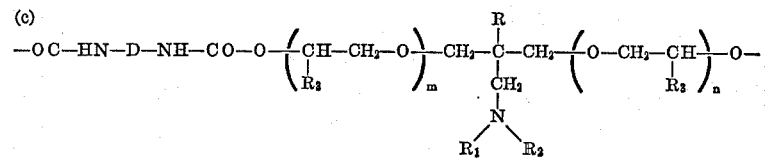

wherein

D represents the radical of an organic diisocyanate without the NCO-groups,

R represents a linear or branched $C_1$-$C_5$ alkyl radical, $R_1$ represents a $C_1$-$C_4$ alkyl radical, $R_2$ represents a $C_1$-$C_{18}$ alkyl radical, $R_3$ represents hydrogen or methyl and $m$ and $n$ each represent a number having an average value from 0 to 25.

2. A segmented polyurethane elastomer comprising recurring structural units of the general formula (a) —O—P—O (b) —Y—X—Y— and (c)

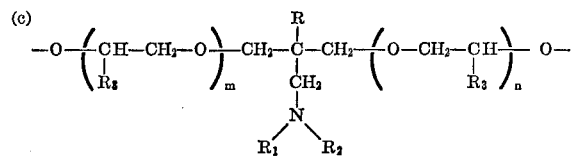

wherein

P represents the radical of a dihydroxy compound of molecular weight 500-5000 without the terminal hydroxyl groups, X represents the radical of a chain lengthening agent without the terminal reactive groups, Y represents —NH— or —O—

R represents a linear or branched $C_1$-$C_5$ alkyl radical, $R_1$ represents a $C_1$-$C_4$ alkyl radical, $R_2$ represents a $C_1$-$C_{18}$ alkyl radical, or $R_1$ and $R_2$, together with the nitrogen atom to which they are attached form a ring containing 4-6 carbon atoms or a ring containing 4-6 carbon atoms and one or more additional hetero atoms, $R_3$ represents hydrogen or methyl, and $m$ and $n$ each represent a number having an average value from 0 to 25, said recurring structural units being attached to each other by structural units of the general formula (d)   —CO—NH—D—NH—CO— wherein

D represents the radical of an organic diisocyanate without the NCO-groups, said structural unit (c) being present in such an amount that said elastomer contains 20-400 milliequivalents of tertiary nitrogen per kilogram of solid polyurethane substance.

3. The segmented polyurethane elastomer of claim 2 the intrinsic viscosity $\eta_{intr.}$ of which is at least 0.5.

4. The segmented polyurethane elastomer of claim 2, comprising additional structural units of the general formula (e)   —O—G—O— wherein G represents the radical of an organic diol having a molecular weight of below 250.

5. The segmented polyurethane elastomer of claim 2, wherein in said Formula c
R represents methyl or ethyl,
$R_1$ and $R_2$ each represent methyl or ethyl or $R_1$ and $R_2$ together with the nitrogen atom to which they are attached represent a pyrrolidone, piperidino or N-methyl piperazino radical, whilst
$R_3$, $m$ and $n$ have the meanings given in claim 1.

6. The segmented polyurethane elastomer of claim 2, wherein in said Formula c R, $R_1$ and $R_2$ independently from each other represent methyl or ethyl, whilst $R_3$, $m$ and $n$ have the meanings given in claim 1.

7. The segmented polyurethane elastomer of claim 6, wherein said Formula c $R_3$ represents methyl.

8. The segmented polyurethane elastomer of claim 7, wherein in said Formula c $m$ and $n$ each represent zero.

9. The segmented polyurethane elastomer of claim 2, wherein said Formula a P represents the radical of a linear OH terminated polyester or polyether having a melting point below 60° C.

10. The segmented polyurethane elastomer of claim 2, wherein said Formula b X represents the radical Z of a chain lengthening agent with terminal $NH_2$-groups without the $NH_2$ groups, and Y represents —NH—.

11. The segmented polyurethane elastomer of claim 10, wherein in said Formula b Z represents a radical selected from the group consisting of an aliphatic, aromatic, araliphatic or cycloaliphatic radical with up to 13 C-atoms, —NH—CO—NH—, an —HN—CO-alkylene radical, an arylene —CO—NH-radical, an —NH—CO—NH-alkylene, —CO—NH-radical, an alkylene —NH—CO—NH-alkylene radical and a direct bond.

12. The segmented polyurethane elastomer of claim 11, wherein said alkylene radicals are selected from the group consisting of ethylene and propylene radicals.

13. Filaments consisting of polyurethane elastomers as claimed in claim 2.

14. Films consisting of polyurethane elastomers as claimed in claim 2.

15. Microporous films consisting of polyurethane elastomers as claimed in claim 2.

16. Solutions of polyurethane elastomers as claimed in claim 2 in 60 to 90% by weight of organic highly polar solvents, said solvents having amide, sulphoxide or sulphone groups and boiling points in the range from 150 to 230° C.

References Cited
UNITED STATES PATENTS

| | | | |
|---|---|---|---|
| 3,454,671 | 7/1969 | Oertel et al. | |
| 3,461,101 | 8/1969 | Oertel et al. | |
| 3,461,102 | 8/1969 | Oertel et al. | 260—75 |
| 3,461,106 | 8/1969 | Oertel et al. | |
| 3,553,173 | 1/1971 | Wieden et al. | |
| 3,575,894 | 4/1971 | Zorn et al. | |

DONALD E. CZAJA, Primary Examiner

H. S. COCKERAM, Assistant Examiner

U.S. Cl. X.R.

260—30.8, 32.6, 75 NQ, 77.5 AQ, 77.5 SP

UNITED STATES PATENT OFFICE
CERTIFICATE OF CORRECTION

Patent No. 3,763,058  Dated October 2, 1973

Inventor(s) Harald Oertel, et al

It is certified that error appears in the above-identified patent and that said Letters Patent are hereby corrected as shown below:

Column 2, line 25, in the formula, "$-CH_2-$" should read
$R_2$

--- $-CH_2-$ ---
$R_3$

Column 3, line 23, in the formula, "$\dagger$" should read ---(f)---.

Column 3, line 73, after "formula" insert ---(f)---.

Column 10, line 35, "65%" should read ---60%---.

Column 10, line 59, "dimethylamine" should read ---dimethylamide---.

Column 15, line 30, "demethylaminoethyl" should read ---dimethylaminoethyl---.

Column 15, line 65, "(2/A)" second occurrence should read ---(2/C)---.

Column 16, Table 1, last column, "V" should read ---Vi---.

Column 16, Table 1, last column next to last line, insert ---3---.

Signed and sealed this 7th day of January 1975.

(SEAL)
Attest:

McCOY M. GIBSON JR.
Attesting Officer

C. MARSHALL DANN
Commissioner of Patents